United States Patent Office 3,436,891
Patented Apr. 8, 1969

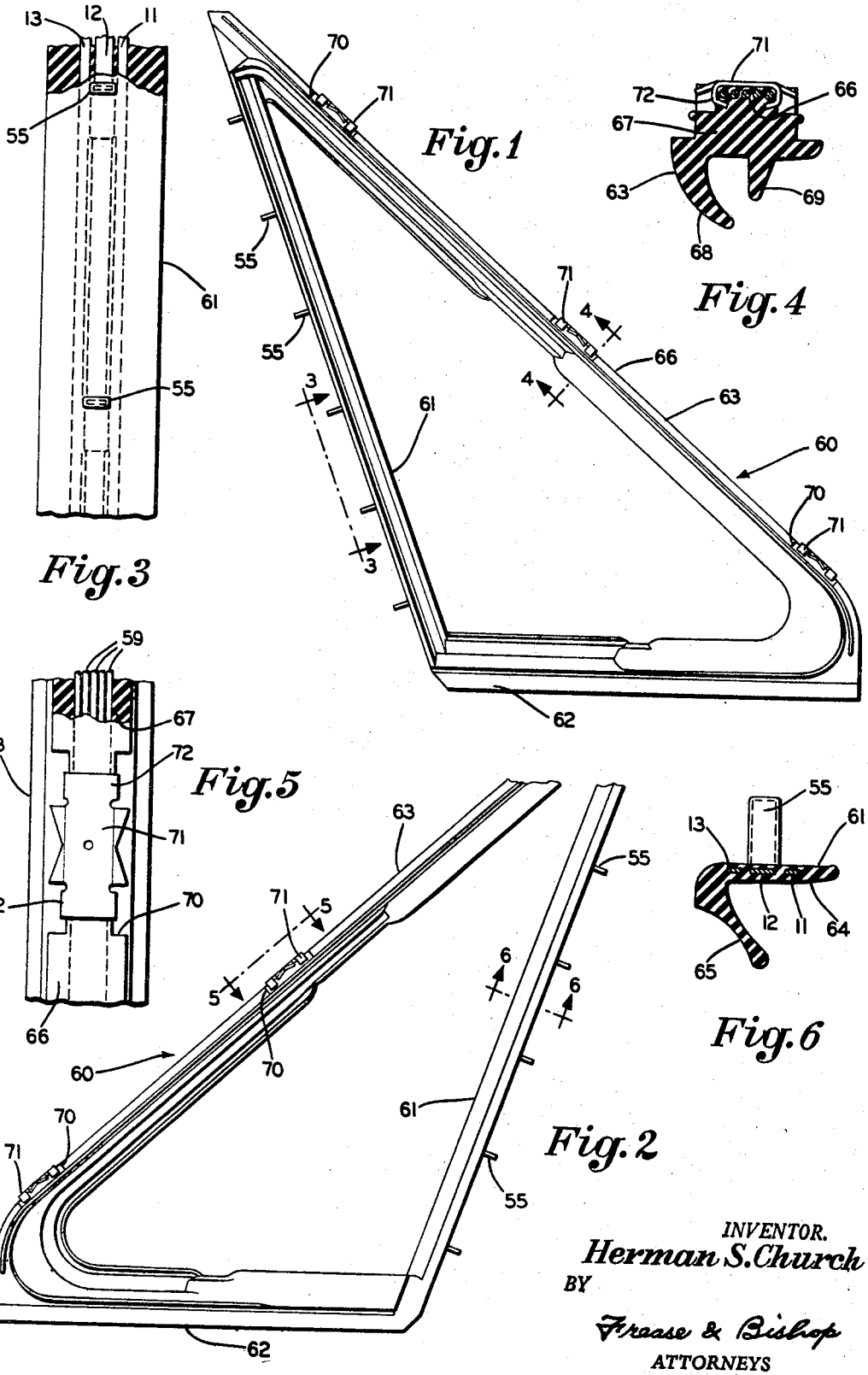

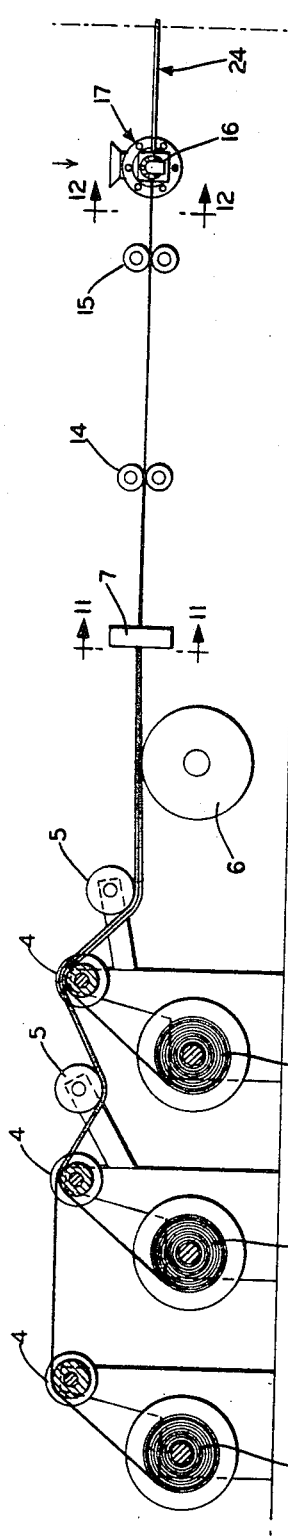

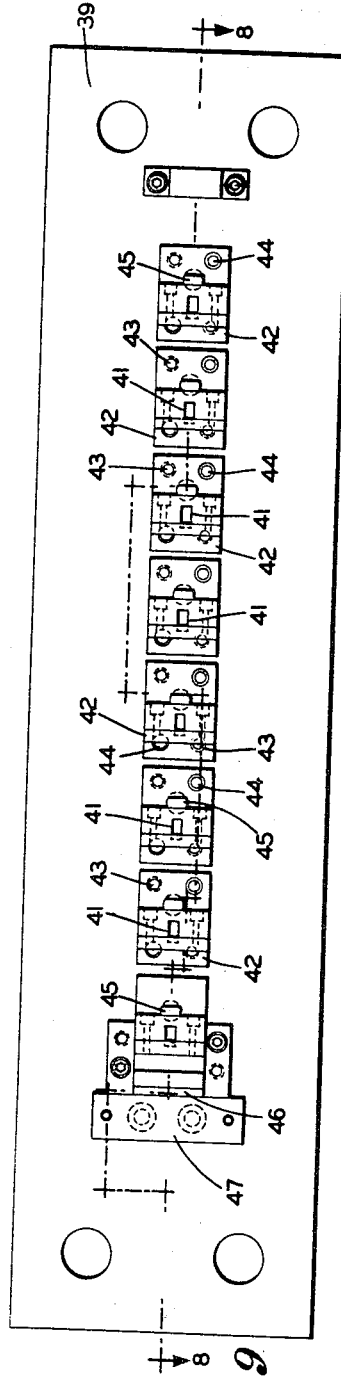
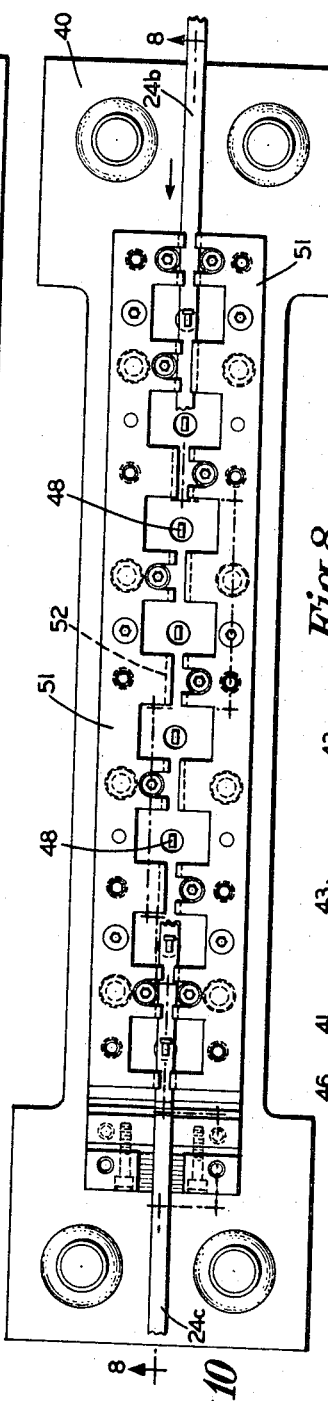
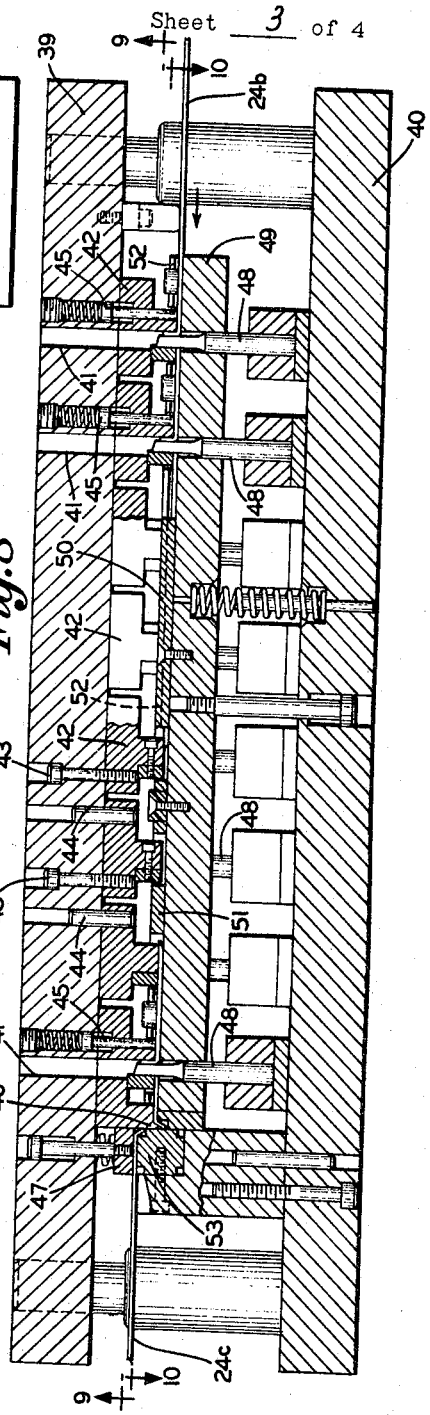

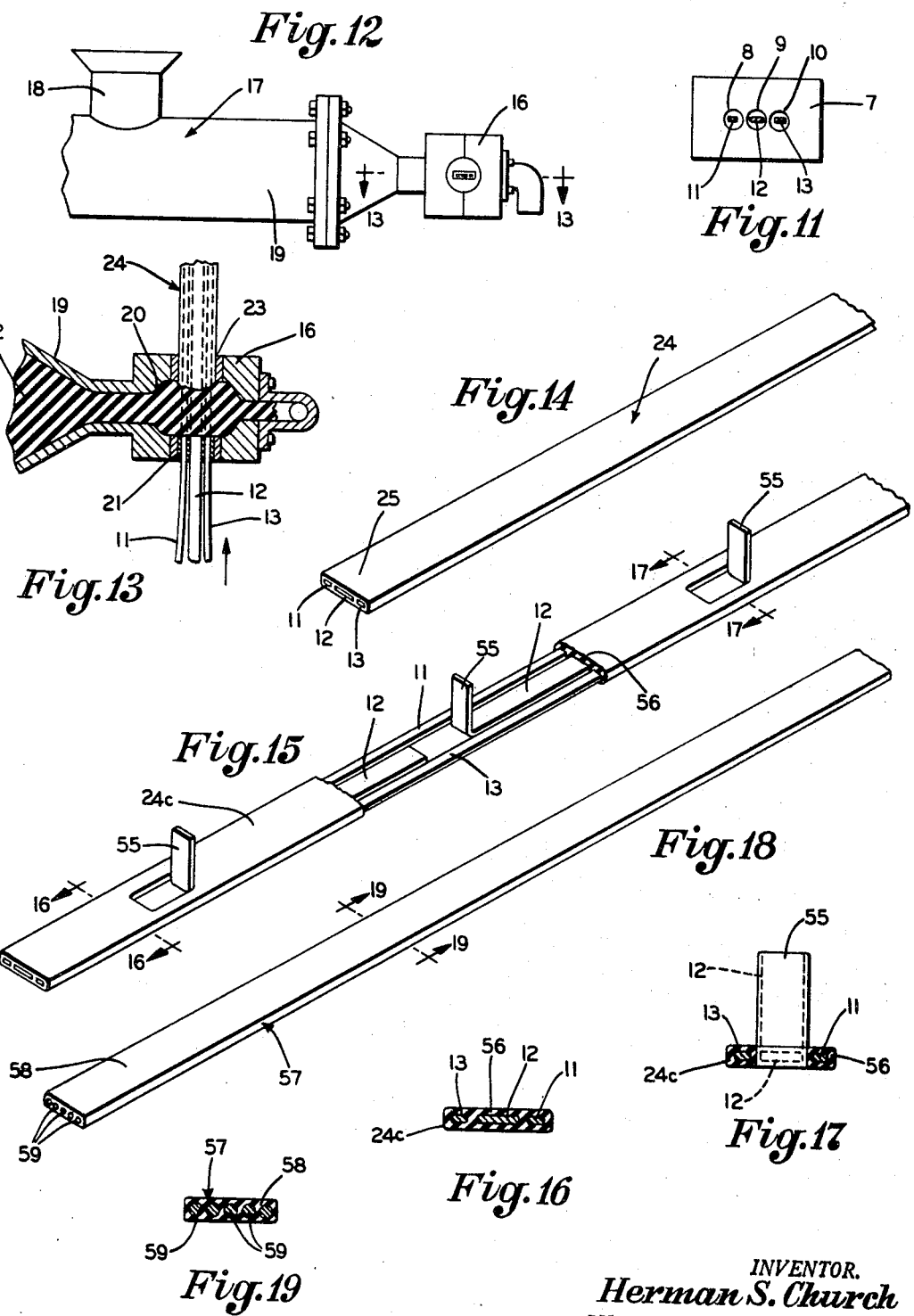

3,436,891
RUBBER MOLDINGS FOR AUTOMOBILE WINDOWS AND MANUFACTURE THEREOF
Herman S. Church, Cuyahoga Falls, Ohio, assignor to The Monarch Rubber Company, Hartville, Ohio, a corporation of Ohio
Filed Aug. 31, 1967, Ser. No. 664,689
Int. Cl. E04c *2/38;* E04f *19/02*
U.S. Cl. 52—716
14 claims

ABSTRACT OF THE DISCLOSURE

A generally triangular reinforced rubber gasket for curved glass automobile quarter-vent windows having a series of metal wires molded side by side in each of at least two of the triangular side members, the wire reinforced gasket side members being laterally flexible in both lateral directions, and the wire reinforcement providing securing means for mounting the gasket in a curved glass window frame.

A method of making a generally triangular reinforced rubber gasket for an automobile curved glass window frame wherein multiple reinforcing wires are integrated side by side in extruded rubber to form reinforcing strips, the rubber bonded wire reinforcing strips are molded as reinforcing members in side members of a triangular molded rubber gasket, the molding is carried out "in-the-flat," and tabs are struck from certain of the wires in the reinforcing strips at intervals to provide mounting and securing means for the gasket.

BACKGROUND OF THE INVENTION

Field of the invention

The invention relates to reinforced rubber moldings used as gaskets or sealing strips that engage and seal the triangular pivoted window when closed in the front door of an automobile. More particularly the invention relates to reinforced rubber moldings for such automobile windows when the windows are formed of curved glass, and to a simplified method of manufacturing reinforced rubber moldings for curved glass quarter-vent windows.

Description of the prior art

The controlled-vent or quarter-vent windows in the front doors of automobiles usually are generally triangular in shape and should be provided with gaskets or seals surrounding the triangularly shaped pivoted glass windows. Early forms of gasket constructions involved a separate rubber gasket strip secured to the window frame along each of the three sides of the triangular window opening. The gasket strips were engaged by the edges of the glass or by channel-shaped metal reinforcement on the glass edges, when the triangular glass window was closed.

Later the rubber gasket design was changed to be a unitary or single triangularly shaped gasket in which metal reinforcement was incorporated on the upright leg of the triangle for mounting the gasket in the window frame. The horizontal leg of the triangular gasket and the hypotenuse leg were engaged and mounted in undercuts in a metal retaining device mounted in the frame.

Difficulties have been experienced with these prior constructions from wind noise where the gasket comprised separate pieces. Where the retainers were designed as die cast window frame parts, undercut recesses could not be provided in the die cast parts for retaining portions of a single triangular gasket. Difficulties became more complex when automotive designs were changed to include curved glass in the controlled-vent or quarter-vent automobile windows, because of the necessity of adapting the gaskets to the curved shapes of the window edges.

Metal reinforcing stampings have been molded integrally with the rubber in the vertical leg of the triangularly shaped gasket in prior molded gaskets for quarter-vent windows. Such metal stamping adapted for curved glass windows had to be provided with a curved shape. This in turn necessitated special very complicated mold cavities for molding the triangular gasket of rubber reinforced with the curved metal stamping. The molds had to have the curved shape of the curved metal reinforcing stamping in the generally vertical leg of the gasket. This increased the mold or die and other tooling and production costs of the reinforced gaskets for the quarter-vent windows to a degree not economically feasible.

Furthermore, the difficulties in providing satisfactory and inexpensive means for securing the single triangular gasket to the window frame increased when the gaskets had to conform to the shape of the curved glass windows.

SUMMARY OF THE INVENTION

Objectives of the invention include providing a new triangular gasket construction with metal reinforcement mounted integrally in at least two of the three sides of the triangle with the metal reinforcement being laterally flexible in both lateral directions so as to permit the gaskets to be molded "in-the-flat" and to accommodate the contour of the curved glass window frame portion on which the gasket is mounted and the contour of the curved glass portion engaged and sealed by the gasket; provided simple securing means interengaged with the flexible gasket reinforcing means which securing means forms a part of the means for mounting the gasket in the window frame; providing a new method of making such single triangular gaskets with flexible metal reinforcing means and integrated securing means without using special curved shape dies or molds; and providing new constructions and procedures eliminating numerous difficulties heretofore encountered, achieving the objectives simply, effectively and inexpensively, and solving problems and satisfying existing needs.

These objectives and advantages are obtained by the reinforced rubber molding construction for automobile quarter-vents, the general nature of which may be stated as including in generally triangular reinforced rubber gasket construction for curved glass automobile windows; integral, generally vertical, horizontal and diagonal molded rubber leg members forming a triangular gasket; a plurality of spaced apart, side by side, flat, metal reinforcing wires molded within and bonded to the rubber in the vertical member throughout its extent; at least one of the flat wires being wider and formed of softer metal than the remaining flat wires; and metal tabs bent from said wider flat wire at intervals along the vertical gasket leg and projecting laterally therefrom.

The objectives and advantages also are obtained by the new method of manufacturing reinforced rubber moldings of generally triangular shape with flexible reinforcing means mounted integrally in at least two legs of the triangle, the general nature of which may be stated as including the steps of mechanically bonding a series of spaced apart, side by side metal reinforcing wires in an uncured rubber strip by extruding rubber around the wires as the wires longitudinally pass through an extrusion die; straightening and sizing the wire reinforced rubber strip; applying antistick to the surfaces of the strip; piercing at least one of the wires at intervals along the length of the strip and bending tabs projecting laterally from the strip at the pierced zones; cutting the strip into lengths to form gasket reinforcing and securing members; placing a reinforcing member in a gasket mold and molding and curing a triangularly shaped gasket in such mold while bonding said reinforcing member within and along the length of one leg of said gasket with the tabs projecting laterally from said one gasket leg; and performing the molding operation in-the-flat.

BRIEF DESCRIPTION OF THE DRAWINGS

Preferred embodiments of the product and procedure of the invention— illustrative of the best modes in which applicant has contemplated applying the principles—are set forth in the following description and shown in the drawings and are particularly and distinctly pointed out and set forth in the appended claims.

FIGURE 1 is a side view looking at the exterior side of one of the improved reinforced molded rubber gaskets for a curved glass quarter-vent window;

FIG. 2 is a similar side view of the molded gasket shown in FIG. 1 looking at the interior side or face of the gasket;

FIG. 3 is an enlarged fragmentary view looking in the direction of the arrows 3—3, FIG. 1;

FIG. 4 is an enlarged sectional view taken on the line 4—4, FIG. 1;

FIG. 5 is an enlarged fragmentary view looking in the direction of the arrows 5—5, FIG. 2;

FIG. 6 is an enlarged sectional view looking in the direction of the arrows 6—6, FIG. 2;

FIGS. 7a, 7b and 7c are diagrammatic side elevation views of an extended production line for producing rubber encased metal reinforcing and securing means strips having two-way lateral flexibility which are incorporated in and molded in the triangular reinforced rubber gasket shown in FIGS. 1 through 6;

FIG. 8 is a sectional view looking in the direction of the arows 8—8, in FIGS. 9 and 10 through the piercing and cutoff die used in the line of equipment illustrated in FIG. 7c;

FIG. 9 is a bottom plan view looking upward on the line 9—9, FIG. 8 of the upper die member of the piercing die;

FIG. 10 is a bottom plan view looking downward in the direction of the arrows 10—10, FIG. 8 of the bottom die member of the piercing die;

FIG. 11 is a fragmentary view of a guide in the production line looking in the direction of the arrows 11—11, FIG. 7a;

FIG. 12 is a fragmentary view of a tuber or tube mill used in the production line of FIG. 7a looking in the direction of the arrows 12—12, FIG. 7a;

FIG. 13 is an enlarged fragmentary sectional view taken on the line 13—13, FIG. 12;

FIG. 14 is a perspective view of a portion of strip in an intermediate stage of producing a reinforcing member in the equipment shown in FIGS. 7a–7b–7c;

FIG. 15 is a fragmentary view similar to FIG. 14 of an end portion of one of the reinforcing members pierced and cut off in the die shown in FIGS. 8, 9 and 10;

FIG. 16 is a sectional view looking in the direction of the arrows 16—16, FIG. 15;

FIG. 17 is a sectional view looking in the direction of the arrows 17—17, FIG. 15;

FIG. 18 is a view similar to FIG. 14 of another form of reinforcing member used in reinforcing other portions of the gasket shown in FIGS. 1 and 2; and FIG. 19 is a sectional view looking in the direction of the arrows 19—19, FIG. 18.

Similar numerals refer to similar parts throughout the drawings.

DESCRIPTION OF THE PREFERRED EMBODIMENT

Referring first to FIGS. 7a, 7b and 7c, a series of strands of preferably copper coated or plated flat wire mounted on reels 1, 2 and 3 are payed out over guide rolls 4 and under tension rolls 5 and are passed side by side over guide roll 6 through a guide plate 7. The guide plate 7 is illustrated in FIG. 11 and has three openings 8, 9 and 10 for the three flat wires 11, 12 and 13. The outside flat wires 11 and 13 are preferably narrow and formed of harder steel than the wider central flat wire 12 which is preferably formed of soft steel.

Flat wires 11, 12 and 13 then pass through stands of pinch rolls 14 and 15 and through the extrusion head 16 of a rubber tuber or tube mill 17. Tuber 17 is of usual construction, rubber stock being fed into hopper 18 and the rubber is extruded through a water cooled housing 19 into the cavity 20 of extrusion head 16. Extrusion head 16 has an inlet die 21 through which the wires 11, 12 and 13 pass in the direction of the arrows indicated in FIG. 13. Rubber stock 22 is extruded around the wires so that the wires are encased in an extruded rubber strip as the strip and wires pass out of extrusion outlet 23 in the form of a strip 24 having the wide central flat wire strip 12 and narrower flat wire strips 11 and 13 side by side held in assembled and in spaced relation by the extruded rubber 25 surrounding the wires 11, 12 and 13 and adhering thereto.

The rubber encased multiple wire reinforced strip 24 preferably then is passed in the direction of the arrows shown in FIG. 7b around water cooled drums 26 and 27 to cool the strip, to pull the strip through the preceding apparatus and to feed out the strip to equipment beyond. Rubber in the extrusion head cavity 20 becomes quite warm from the extrusion working thereof which is the reason for cooling the strip 24 around drums 26 and 27. Strip 24 then passes through a stand of pinch rolls 28 and between grooved guide and sizing rolls 29 rotating on vertical axes as well as between grooved sizing rolls 30 on horizontal axes. The sized strip 24a is pulled through the sizing rolls and from cooling drums 26 and 27 by pinch rolls 31.

Strip 24a then is passed through tank 32 containing anti-adherent or anti-stick material to treat the strip surfaces so that they will not stick to piercing dies in a subsequent piercing operation.

Strip 24b emerging from tank 32 then passes between guide rolls 33 and through an intermittent feed mechanism generally indicated at 34 which intermittently feeds a predetermined length of the strip 24b to the press generally indicated at 35. The feed mechanism is of usual construction and includes a feed cylinder 36 and clamping devices shown at 37 and 38, one of which is moved between positions shown in full and dot-dash lines to accomplish intermittent feed of the strip 24b.

The upper and lower piercing and cutoff die members 39 and 40 (FIGS. 8, 9 and 10) are mounted in the press 35. The upper die 39 has a series of knife-receiving cavities 41 formed therein extending through pads 42 mounted on the die 39 by bolts 43 and pins 44. Each pad 42 preferably also mounts a spring-pressed plunger 45 adapted to engage and hold the strip 24b as it is fed to press 35. A cutoff knife 46 and an adjacent pressure pad 47 also are mounted on the upper die 39.

The lower die 40 has a series of upwardly projecting piercing punches 48 extending through openings in movable guide and pressure plate 49. The punches 48 cooperate with cavities 41 to pierce the strip 24b when the die members are closed. Plate 49 has guide and stripper plates 50 and 51 which provide a channel 52 along which strip 24b travels as it is fed intermittently to and through the dies 39 and 40. The lower die also has a knife anvil 53 which cooperates with knife 46 and pad 47 to cut the strip 24b into sections.

The dies 39 and 40 are illustrated closed at the completion of a piercing operation. When the dies open, plate 49 strips the pierced strip 24b from the punches 48. The intermittent feed mechanism 34 then feeds the strip 24b to the left (FIG. 8) a predetermined distance equal to the length of the reinforcing member to be cut therefrom that has been pierced as shown at 24c in FIGS. 7c, 8 and 15. The upper die 39 then moves down and punches 48 pierce the strip 24b at intervals and the end of the strip projecting to the left of the dies in FIG. 8 is cut off, the cutoff reinforcing member 24c dropping into a handling box 54 (FIG. 7c).

At each place where the strip 24b is pierced, a tab 55 is turned at right angles to project laterally from member 24c, the tabs 55 being struck and bent from the middle flat wire 12 extending longitudinally within and held in position in the wire reinforced rubber strip. Thus, the wire 12 is severed at intervals, but each severed section thereof having a tab 55 thereon is held in position by the uncured rubber 56 which forms the strip 24 from which member 24c is cut.

FIGURES 18 and 19 show a wire reinforced rubber strip 57 composed of extruded rubber 58 and longitudinal wires 59 which may be made in the same way as the strip 24 by passing the five wires illustrated through an extrusion tuber similar to tuber 17. The strip 57 however is not pierced and is used for purposes to be described.

Referring to FIGS. 1 through 6 the generally triangular shaped gasket 60 has a generally vertical leg 61, a horizontal leg 62, and a diagonal leg 63. The gasket 60 is molded from rubber in a usual manner to have a shape and sectional contour required for mounting in a window frame in an automobile in which a triangular glass window or quarter-vent is pivotally mounted for opening and closing movement.

The effective seal of the window is obtained by stably mounting the gasket in the window frame opening. Heretofore bolts, rivets or other mechanical fasteners have been used to secure the gasket to the frame. These securing devices however have never been entirely satisfactory.

In accordance with the invention, one of the reinforcing strips 24c (FIGS. 7c and 15) is placed in the mold cavity of the forming and curing dies or molds in the zone or region where the vertical leg 61 is to be formed so that the completed gasket 60 has the tabs 55 projecting outwardly therefrom as shown in FIGS. 1, 2 and 6. The vertical leg may have a channel-like cross-sectional shape as shown in FIG. 6 with the securing flange 64 and sealing flange 65 extending longitudinally of the leg member 61.

The gasket 60 thus may be mounted in an automobile window frame with the tabs 55 projecting through openings in the frame and the tabs then may be bent over to secure and mount the gasket stably in the frame. Stability is achieved because the tabs are an integral part of the flat reinforcing wires in the vertical leg 61 of the frame. The leg 61 is identified as being a vertical member though it does angle somewhat from vertical to accommodate the angle of diagonal leg 63 which must follow the contour of the side edge of the automobile windshield. It is noted viewing FIGS. 6 and 16 that the uncured rubber 56 in reinforcing member 24c has merged with and become a part of the rubber molded to form the securing flange 64.

Also in accordance with the invention, a length of wire reinforced rubber strip 57 (FIG. 18) is placed in the mold in the zone or region where the diagonal leg 63 of the gasket is formed so that the reinforcing wires are located near the outer edge 66 of the diagonal leg 63 (FIG. 4). Leg 63 may have the cross-sectional shape shown in FIG. 4 including the body portion 67 and sealing flanges 68 and 69. Body portion 67 may be recessed at 70 at intervals (FIG. 5) so that metal point clips 71 may be clinched at 72 around the reinforcing wires 59 to secure the clips 71 to the gasket 60. The points of the clips 71 may be forced into recesses in stampings or die-cast frame parts of the window frame whereon the diagonal leg 63 of the gasket 60 is mounted or secured. This avoids having to provide undercuts in the frame previously used for gasket mounting and which cannot be provided in die-cast members.

The gasket 60 may be molded and the wire reinforced rubber strip members 24c and 57 integrated therewith in forming and curing dies usually used for making composite metal-rubber parts "in-the-flat," that is with the parting line between the molds in or parallel to the plane of the paper on which the gasket is shown in FIGS. 1 and 2. However, the wire reinforced legs 61 and 63 are flexible laterally in two directions, that is in the plane and perpendicular to the plane of the paper on which FIGS. 1 and 2 appear or flexible laterally in the direction in which the tabs 55 extend and also perpendicular to the laterally extending tabs 55. This flexibility permits the gasket 60 to be reshaped to conform to the contour of the curved glass mounted and movable in the window frame sealed by the gasket.

All of the reinforcing wires excepting wire 12 are preferably formed of high carbon spring steel to impart springiness and stiffness to the wire and the gasket legs reinforced thereby. Flat wire 12 which is pierced and from which the tabs 55 are struck preferably is formed of soft low carbon steel to permit formation and clinching of tabs 55.

Accordingly, the present invention provides a new rubber gasket construction reinforced with steel wires which may be molded "in-the-flat" and then reshaped to the contour of curved glass windows sealed thereby; provides a construction and securing means therefor that may readily be fastened to the window frame with the fastening means integrated with the metal gasket leg reinforcement; provides a construction which eliminates the necessity of using costly forming and curing dies for gaskets curved as molded to the curved shape of the glass to be sealed; provides a gasket or molding that is very easy to install with low installation costs and which fit the window frame tightly on installation without special adjustments; provides a construction which may be readily molded with low tooling costs; provides a construction in which the adhesion between the metal and rubber is improved since the forming of the rubber encased wire reinforced members by extruding provides a mechanical bond in addition to the chemical bond resulting from the molding and curing operation; provides a new procedure for making reinforced rubber gaskets for curved glass windows; and provides a simplified construction eliminating difficulties encountered with prior devices, achieving the objectives and solving problems existing in the art.

In the foregoing description, certain terms have been used for brevity, clearness and understanding; but no unnecessary limitations are to be implied therefrom beyond the requirements of the prior art, because such terms have been used for descriptive purposes and are intended to be broadly construed.

Moreover the description and illustration of the invention is by way of example, and the scope of the invention is not limited to the exact details or to the particular shapes or proportions shown or described or to the number of reinforcing wires used.

Having now described the features, discoveries and principles of the invention, the manner in which the improved gaskets may be made and installed, the characteristics of the new construction, and the advantageous, new and useful results obtained; the new and useful structures, devices, elements, arrangements, parts, combinations, methods, steps and procedures, and mechanical equivalents obvious to those skilled in the art are set forth in the appended claims.

I claim:

1. In generally triangular, reinforced, rubber gasket construction for curved glass automobile windows; integral, generally vertical, horizontal and diagonal molded rubber leg members forming a triangular gasket; a plurality of spaced apart, side by side, flat, metal reinforcing wires molded within and bonded to the rubber in one of the leg members throughout its extent; at least one of the flat wires being wider and formed of softer metal than the remaining flat wires; and metal tabs bent from said wider flat wire at intervals along said one gasket leg and projecting laterally therefrom.

2. The gasket construction defined in claim 1 in which the wider flat wire is severed where each metal tab is bent to project laterally from said one gasket leg and has spaced apart sections held in position in said one leg by the rubber bonded thereto.

3. The gasket construction defined in claim 2 in which there are two narrow flat wires molded within and bonded to the rubber in said one leg side by side, and in which said wider flat wire is located between said two narrow flat wires.

4. The gasket construction defined in claim 3 in which the narrow flat wires are formed of high carbon steel and in which the wider flat wire is formed of soft, low carbon steel.

5. The gasket construction defined in claim 1 in which said flat reinforcing wires are molded within the vertical leg member.

6. The gasket construction defined in claim 1 in which a second molded rubber leg member has a generally rectangular body portion provided with an outer face surface and side surfaces extending throughout the length of said second leg member; in which a plurality of spaced apart, side by side, metal reinforcing wires are molded within and bonded to the rubber in said second leg member adjacent said outer face surface; in which a pair of notches are formed in said body portion side surfaces at intervals along the length of said second leg member; and in which a metal fastener member is clinched into said rectangular body portion and around said reinforcing wires at each of said pair of notches.

7. The gasket construction defined in claim 6 in which said second leg member is the diagonal leg member.

8. A rubber encased multiple wire reinforcing member for use as reinforcement for a reinforced rubber gasket for curved glass automobile windows, the member comprising two longitudinally extending narrow flat wires formed of high carbon steel; an intervening wider flat wire formed of softer low carbon steel located side by side and spaced apart between said narrow flat wires; said wider flat wire being severed at intervals and formed with a bent laterally extending tab at the location of each sever; and said narrow and wider wires being held together and mechanically bonded within and encased by rubber in an uncured rubber strip; whereby such rubber encased flat wire reinforcing member may be molded within and bonded to the rubber in a reinforced rubber gasket to form reinforcing and fastening means for said gasket.

9. In a method of making a generally triangular reinforced rubber gasket for curved glass automobile windows having generally vertical, horizontal and diagonal molded rubber leg members; the steps of encasing and mechanically bonding a series of spaced apart, side by side metal reinforcing wires in an uncured rubber strip by extruding rubber around the wires as the wires longitudinally pass through a body of rubber under extrusion pressure; piercing at least one of the wires at intervals along the length of the strip and bending a tab to project laterally from the strip at each pierced zone; cutting the pierced strip into lengths to form gasket reinforcing and securing members having tabs projecting integrally therefrom; placing a reinforcing member in one leg forming cavity of a gasket forming and curing mold; molding and curing rubber in the mold to form a gasket and bonding said reinforcing member within and along the length of said one gasket leg with the tabs projecting laterally from said one gasket leg; and performing the molding operation in-the-flat; whereby the reinforced gasket leg may be flexed laterally in any direction after molding for assembling the gasket in a window frame for a curved glass window.

10. The method set forth in claim 9 in which the extruded uncured rubber encased wire reinforced strip is straightened and sized, and antistick material is applied to the surfaces of the strip prior to piercing the strip at intervals.

11. The method set forth in claim 9 in which a series of spaced apart, side by side metal reinforcing wires are mechanically bonded in a second uncured rubber strip by extruding rubber around the wires; in which said second strip is cut into lengths to form second gasket reinforcing and securing members; in which one of said second reinforcing members is placed in another leg forming cavity portion of said gasket forming and curing die; and in which said second reinforcing member is bonded within and along the length of said second gasket leg during the gasket molding operation.

12. Reinforced rubber gasket construction for curved glass automobile windows, including a channel-like molded rubber gasket member having longitudinally extending securing and sealing flanges; a plurality of spaced apart, side by side, flat, longitudinally extending metal reinforcing wires molded within and bonded to the rubber in the gasket member securing flange throughout its extent; at least one of the flat wires being wider and formed of softer metal than the remaining flat wires; and metal tabs bent from said wider flat wire at intervals along said securing flange and projecting laterally therefrom.

13. The gasket construction defined in claim 12 in which the spacing of the reinforcing wires bonded to the rubber in the gasket securing flange provides flexibility of the gasket member laterally in two directions, first in the direction in which the tabs extend laterally, and second in a direction perpendicular to said first direction; whereby said gasket member may be reshaped to conform to the contour of a curved glass window to be sealed by the gasket member.

14. In a method of making a reinforced rubber gasket member for curved glass automobile windows; the steps of encasing and mechanically bonding a series of spaced apart, side by side metal reinforcing wires in an uncured rubber strip by extruding rubber around the wires as the wires longitudinally pass through a body of rubber under extrusion pressure; piercing at least one of the wires at intervals along the length of the strip and bending a tab to project laterally from the strip at each pierced zone; cutting the pierced strip into lengths to form gasket reinforcing and securing members having tabs projecting integrally therefrom; placing a reinforcing member in a gasket member cavity of a gasket forming and curing mold; molding and curing rubber in the mold to form a gasket member and bonding said reinforcing member within and along the length of said gasket member with the tabs projecting laterally from said gasket member; and performing the molding operation in-the-flat; whereby the reinforced gasket member may be flexed laterally in any direction after molding for assembling the gasket member in frame means for a curved glass window.

References Cited
UNITED STATES PATENTS

| | | | |
|---|---|---|---|
| 1,961,352 | 6/1934 | Hall | 52—400 X |
| 2,835,924 | 5/1958 | Schmeling | 49—489 X |
| 2,954,310 | 9/1960 | Truesdell et al. | 52—627 X |
| 3,382,619 | 5/1968 | Bemis | 49—489 X |

ALFRED G. PERHAM, *Primary Examiner.*

S. D. BURKE, *Assistant Examiner.*

U.S. Cl. X.R.

29—417, 527; 49—391, 489, 494; 52—397, 403